(12) United States Patent
Kim et al.

(10) Patent No.: US 12,461,285 B2
(45) Date of Patent: Nov. 4, 2025

(54) COVER WINDOW, METHOD OF PROVIDING COVER WINDOW, AND DISPLAY DEVICE INCLUDING COVER WINDOW

(71) Applicant: Samsung Display Co., LTD., Yongin-si (KR)

(72) Inventors: Sung Hoon Kim, Asan-si (KR); Young Do Kim, Suwon-si (KR); Yu Ri Kim, Guri-si (KR); Hyun Seok Oh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 707 days.

(21) Appl. No.: 17/698,227

(22) Filed: Mar. 18, 2022

(65) Prior Publication Data

US 2022/0308266 A1    Sep. 29, 2022

(30) Foreign Application Priority Data

Mar. 24, 2021    (KR) .................. 10-2021-0038226

(51) Int. Cl.
*G06F 1/16*      (2006.01)
*G02B 1/04*      (2006.01)
(Continued)

(52) U.S. Cl.
CPC .................. *G02B 1/14* (2015.01); *G02B 1/04* (2013.01); *G02F 1/133305* (2013.01);
(Continued)

(58) Field of Classification Search
CPC ............ G06F 1/1652; G02F 1/133302; G02F 1/133305; G02F 1/133331; H10K 2102/311; H10K 77/111; G09F 9/301
See application file for complete search history.

(56) References Cited

U.S. PATENT DOCUMENTS 9,354,476 B2    5/2016    Han et al.
10,020,462 B1   7/2018    Ai et al.
(Continued)

FOREIGN PATENT DOCUMENTS

KR    20150017819 A    2/2015
KR    1020180079093 A    7/2018
(Continued)

OTHER PUBLICATIONS

U.S. Appl. No. 63/127,690.*
(Continued)

*Primary Examiner* — Z. Jim Yang
(74) *Attorney, Agent, or Firm* — CANTOR COLBURN LLP

(57) ABSTRACT

A cover window includes a glass including a folding portion and a non-folding portion, and a groove in the folding portion of the glass. The glass which is folded at the folding portion includes an inner surface that is compressed and an outer surface that is stretched, the groove filled with a multi-layered resin layer, a storage modulus of a layer of the multi-layered resin layer which is closest to the inner surface being largest, and elongation of a layer of the multi-layered resin layer which is closest to the outer surface being largest.

15 Claims, 16 Drawing Sheets

(51) Int. Cl.
  *G02B 1/14* (2015.01)
  *G02F 1/1333* (2006.01)
(52) U.S. Cl.
  CPC ...... *G02F 1/133331* (2021.01); *G06F 1/1652*
  (2013.01); *Y10T 428/24521* (2015.01); *Y10T 428/24612* (2015.01)

(56) References Cited

U.S. PATENT DOCUMENTS

| | | | |
|---|---|---|---|
| 10,314,184 | B2 | 6/2019 | Choi et al. |
| 10,840,474 | B2 | 11/2020 | Ai et al. |
| 11,627,679 | B2 | 4/2023 | Sunwoo et al. |
| 2017/0229665 | A1* | 8/2017 | Park .................... H10K 50/844 |
| 2018/0134007 | A1* | 5/2018 | Lee ........................ B32B 25/20 |
| 2018/0217639 | A1* | 8/2018 | Jones .................... H05K 1/028 |
| 2020/0089274 | A1* | 3/2020 | Kim ...................... G06F 1/1643 |
| 2020/0171781 | A1* | 6/2020 | Zhang ...................... B32B 7/04 |
| 2020/0212340 | A1* | 7/2020 | Ai ........................ H10K 59/871 |
| 2020/0313111 | A1* | 10/2020 | Kim ....................... H10K 59/87 |
| 2021/0108077 | A1* | 4/2021 | Berleue .............. C08F 290/067 |
| 2021/0216100 | A1* | 7/2021 | Smeeton .............. G06F 1/1652 |
| 2021/0251090 | A1* | 8/2021 | Ha .......................... B32B 15/04 |
| 2021/0376284 | A1* | 12/2021 | Park ................... H10K 59/8721 |
| 2022/0201885 | A1* | 6/2022 | Nguyen ................ G06F 1/1652 |
| 2022/0209165 | A1* | 6/2022 | Hyun ................... H10K 50/841 |
| 2022/0390985 | A1* | 12/2022 | Lee ........................... B32B 3/02 |
| 2023/0309368 | A1* | 9/2023 | Allan ................... H10K 77/111 |
| 2023/0341904 | A1* | 10/2023 | Liang .................... B32B 15/085 |
| 2025/0063677 | A1* | 2/2025 | Liu .......................... H05K 5/03 |
| 2025/0203795 | A1* | 6/2025 | Qaroush .................. B32B 3/04 |

FOREIGN PATENT DOCUMENTS

| | | |
|---|---|---|
| KR | 10-2146730 B1 | 8/2020 |
| KR | 102167404 B1 | 10/2020 |
| KR | 10-2181655 B1 | 11/2020 |

OTHER PUBLICATIONS

Kim et al., "Controlled multiple neutral planes by low elastic modulus adhesive for flexible organic photovoltaics", Nanotechnology, 28 (2017)194002 9pp.

* cited by examiner

COVER WINDOW, METHOD OF PROVIDING COVER WINDOW, AND DISPLAY DEVICE INCLUDING COVER WINDOW

This application claims priority to Korean Patent Application No. 10-2021-0038226 filed on Mar. 24, 2021, and all the benefits accruing therefrom under 35 U.S.C. § 119, the entire contents of which are incorporated herein by reference.

BACKGROUND

(a) Field

The present disclosure relates to a cover window, a method of providing the cover window, and a display device including the cover window.

(b) Description of the Related Art

A display device such as an organic light emitting display and a liquid crystal display includes a display panel provided including multiple layers and elements on a substrate. A flexible display panel and a flexible display device which includes the same have been developed.

The flexible display device may be classified into a bendable display device, a foldable display device, a rollable display device, a stretchable display device, and the like according to its purpose or shape. Among these, the foldable display device may be folded and unfolded like a book. The foldable display device may be folded and be compactly portable, and when used, it may be unfolded to use a wide screen.

SUMMARY

Embodiments provide a cover window with improved folding characteristics and a display device including the same.

An embodiment provides a cover window including a glass including a folding portion and a non-folding portion, and a plurality of grooves in the folding portion of the glass. The glass which is folded at the folding portion includes an inner surface that is compressed and an outer surface that is stretched, the groove filled with a multi-layered resin layer, a storage modulus of a layer of the multi-layered resin layer which is closest to the inner surface being largest, and elongation of a layer of the multi-layered resin layer which is closest to the outer surface being largest.

The groove may be recessed in a direction from the outer surface toward the inner surface.

A storage modulus of a layer in the groove which is closest to the inner surface may be about 0.046 megapascal (MPa) or less at 20 degrees Celsius (° C.).

Elongation of a layer in the groove which is closest to the outer surface may be about 120% or more.

A difference in refractive index between layers of the multi-layered resin layer included in the groove may be less than about 2%, and a difference in refractive index between the resin layer included in the groove and the glass may be less than about 2%.

The resin layer included in the groove and the glass may have a refractive index of about 1.48 to about 1.52.

The multi-layered resin layer may include a first layer and a second layer, the first layer may include an acrylate-based resin, and the second layer may include a silicone-based resin.

The multi-layered resin layer may include a first layer, a second layer, and a third layer, the first layer may include an acrylate-based resin, the second layer may include an acrylate-based resin or a urethane acrylate-based resin, and the third layer may include a silicone-based resin.

The multi-layered resin layer may include a first layer, a second layer, a third layer, and a fourth layer, the first layer may include an acrylate-based resin, the second layer and the third layer may include an acrylate-based resin or a urethane acrylate-based resin, and the fourth layer may include a silicone-based resin.

A thickness difference between layers of the multi-layered resin layer may be about 10% to about 300%.

A lowermost layer of the multi-layered resin layer in the groove may have a lowest viscosity, and an uppermost layer of the multi-layered resin layer in the groove may have a highest viscosity.

A side surface of the glass may define the groove and may be an inclined surface.

A side surface of the glass may define the groove and may be perpendicular to a flat surface of the cover window.

A thickness of the glass in the non-folding portion may be about 150 micrometers ($\mu m$) or more, and a thickness of the glass in an area in which the groove is disposed may be about 30 $\mu m$ or less.

The cover window may be foldable in a first direction, and the groove may extend along a second direction crossing the first direction.

An embodiment provides a display device including the cover window described above, and a display panel contacting the cover window.

An embodiment provides a method of providing a cover window, the method including providing a groove in a glass, providing a first layer in the groove, providing a second layer on the first layer in the groove and providing a third layer on the second layer in the groove. A storage modulus of the first layer is largest, and elongation of the third layer is largest.

A viscosity of the first layer may be smaller than that of the second layer, and a viscosity of the second layer may be smaller than that of the third layer.

The first layer may be provided by an inkjet method, the second layer may be provided by an inkjet method or slot coating, and the third layer may be provided by slot coating or vacuum compression.

The first layer may include an acrylate-based resin, and the third layer may include a silicone-based resin.

According to one or more of the embodiments, a foldable glass with improved folding characteristics and a display device including the same are provided.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1:
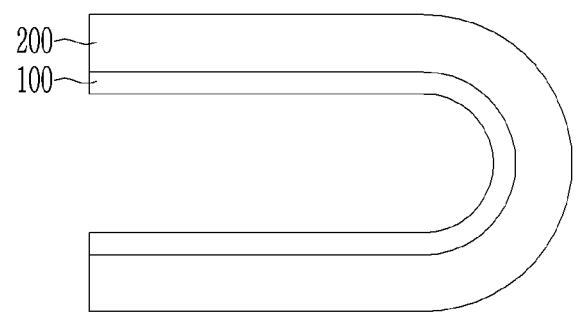
FIG. 1 illustrates a schematic view of an embodiment of a display device.

The invention will be described more fully hereinafter with reference to the accompanying drawings, in which embodiments of the invention are shown. As those skilled in the art would realize, the described embodiment may be modified in various different ways, all without departing from the spirit or scope of the invention.

In order to clearly describe the invention, parts that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area or substrate is referred to as being related to another element such as being "on" another element, it can be directly on the other element or intervening elements may also be present. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Further, in the specification, the word "on" or "above" means positioned on or below the object portion, and does not necessarily mean positioned on the upper side of the object portion based on a gravitational direction.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When a foldable display device is repeatedly folded and unfolded, deformation may occur in an area (hereinafter, referred to as a bending area) in which a display device is bendable, and the bending area may be damaged. In addition, deformation such as buckling or a crack may occur in the bending area and in areas excluding the bending area so as to be damaged.

Hereinafter, a cover window 100 and a display device which includes the same will be described with reference to the accompanying drawings.

FIG. 1 illustrates a schematic view of an embodiment of a display device. Referring to FIG. 1, the display device may be a foldable display device. As shown in FIG. 1, the display device may include a display panel 200, and a cover window 100 which is positioned on one surface of the display panel 200.

The display panel 200 may be a light emitting display panel including a plurality of light-emitting elements, or may be a liquid crystal display. A surface on which the cover window 100 of the display panel 200 is positioned may be a display surface at which an image is displayed. Referring to FIG. 1, the display device may be folded in a direction such that two parts of the cover window 100 may face each other. That is, the display surface may not be exposed or may not face outside the display device during folding, and the display surface for an image may be exposed or may face outside the display device when the display device is unfolded. The cover window 100 to be described below may be applied as the cover window 100 of the display device.

Figure 2:
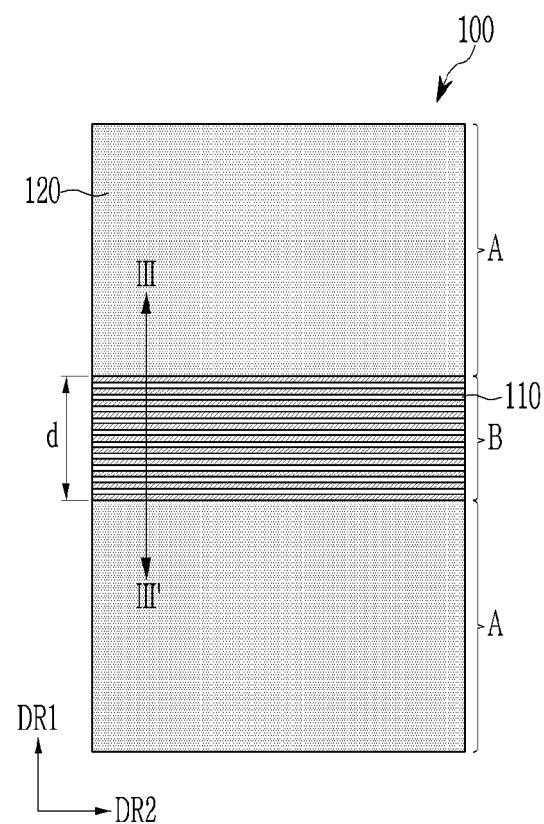
FIG. 2 illustrates an embodiment of a cover window which is unfolded.
Figure 3:
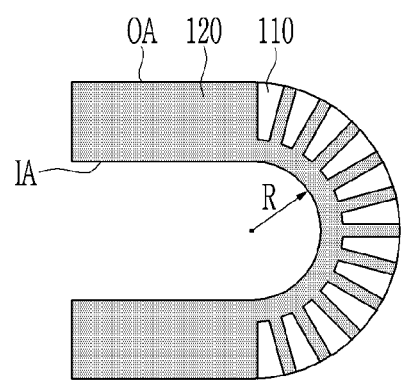
FIG. 3 illustrates an embodiment of a cover window which is folded, and is a view taken along line III-III' of FIG. 2.

FIG. 2 and FIG. 3 illustrate an embodiment of the cover window 100. FIG. 2 illustrates a plan view of the cover window 100 which is unfolded or flat, and FIG. 3 illustrates a cross-sectional view the cover window 100 which is folded, taken along line III-III' of FIG. 2.

Referring to FIG. 2, the cover window 100 includes a folding portion B that is bendable when the display device is folded and a non-folding portion A that is not bendable or is not bent when the display device is folded. Various layers and components of the display device may include a folding portion B and a non-folding portion A corresponding to those described above. Referring to FIGS. 1, 2 and 3, for example, the display panel 200 includes a folding portion B and a non-folding portion A corresponding to those of the glass 120 and the display panel 200 is foldable together with the glass 120.

The display device which is folded at the folding portion B defines a curvature radius of various elements or layers of the display device. Referring to FIG. 2 and FIG. 3, the cover window 100 which is folded defines a curvature radius (R) and a length (d) of the folding portion B as πR.

Referring to FIG. 2 and FIG. 3, the cover window 100 includes a glass 120 as a light-transmitting member and a groove 110 provided in plural including a plurality of grooves 110 which are provided or formed in the glass 120.

The cover window 100 may be foldable about a folding axis. Referring to FIG. 2, the cover window 100 which is folded along a first direction DR1 which crosses the folding axis disposes the plurality of grooves 110 extended and be positioned in a second direction DR2 crossing the first direction DR1. Referring to FIG. 2 and FIG. 3, the folding axis extends along the second direction DR2. A thickness direction of the cover window 100 may be a third direction. Referring to FIG. 2, the thickness direction (e.g., third direction) may cross a plane defined by the first direction DR1 and the second direction DR2 crossing each other.

FIG. 3 illustrates a view taken along line III-III' of FIG. 2. In FIG. 3, the cover window 100 which is folded disposes parts of a surface positioned at the inside thereof facing each other to define an inner surface IA, and disposes a surface positioned facing outside the cover window 100 to define an outer surface OA. That is, in the cover window 100 which is folded, a surface to be compressed is the inner surface IA, and a surface to be stretched is the outer surface OA.

When the cover window 100 is combined with the display panel 200, an image is displayed at the inner surface IA of the cover window 100, and the display panel 200 may contact the outer surface OA. That is, the inner surface IA may be the display surface, and the outer surface OA may be the non-display surface. As being in contact, elements may form an interface with each other, without being limited thereto.

Referring to FIG. 2 and FIG. 3, the plurality of grooves 110 are formed in the folding portion B of the cover window 100. The plurality of grooves 110 may be formed recessed from the outer surface OA in a direction from the outer surface OA toward the inner surface IA. The plurality of grooves 110 may be open to outside the cover window 100. The plurality of grooves 110 are formed at intervals along an entirety of the folding portion B, and may not be exposed in the inner surface IA of the cover window 100. FIG. 2 is a view of the outer surface OA of the cover window 100 at which the groove 110 is visually recognizable from outside the cover window 100. In contrast, the groove 110 may not be visually recognizable by viewing the inner surface IA of the cover window 100.

Although being separately described later, the plurality of grooves 110 are filled with a multi-layered material 110a. Since the plurality of grooves 110 are filled with materials having different physical properties in a multi-layered manner, durability and physical characteristics of the cover window 100 may be increased.

Figure 4:
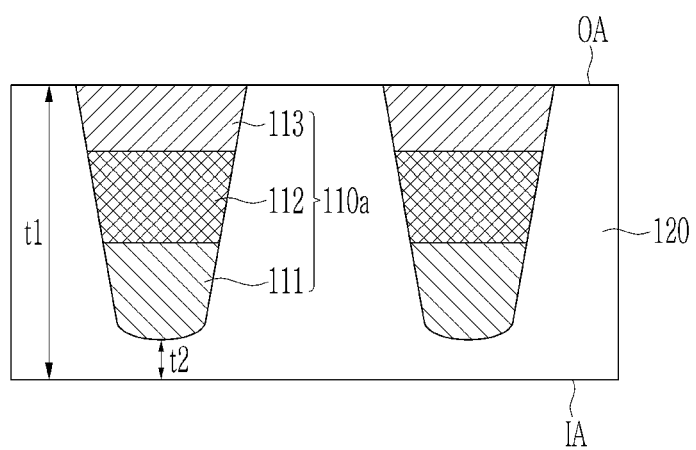
FIG. 4 illustrates a cross-sectional view of an embodiment of a folding portion of a cover window.

FIG. 4 illustrates a cross-sectional view of an embodiment of the folding B portion of the cover window 100. Referring to FIG. 4, the cover window 100 includes the glass 120 and the plurality of grooves 110 which are formed in the glass 120. The groove 110 is recessed in a direction from the outer surface OA toward the inner surface IA.

As shown in FIG. 4, the groove 110 is filled with a multi-layered material 110a. As shown in FIG. 4, the multi-layered material 110a may include a first layer 111, a second layer 112, and a third layer 113 in order in a direction from the inner surface IA to the outer surface OA. In this case, the first layer 111, the second layer 112, and the third layer 113 may include the same material or different materials.

In an embodiment, for example, the first layer 111, the second layer 112, and the third layer 113 may each include one or more of an acrylate-based resin, a urethane acrylate-based resin, and a silicone-based resin. In the present specification, the acrylate-based resin means a resin containing an acrylate monomer, and the urethane acrylate-based resin means a resin containing a urethane acrylate monomer. In addition, the silicone-based resin means a resin containing a silicone monomer. The multi-layered material 110a may define a multi-layered resin layer. The multi-layered resin layer includes a plurality of resin layers.

Even if the first layer 111, the second layer 112, and the third layer 113 include different materials, refractive indexes of respective layers may be substantially the same. In the present embodiment, the meaning that the refractive indexes are substantially the same includes a case in which a difference therebetween is less than about 2%.

In addition, the refractive indexes of the first layer 111, the second layer 112, and the third layer 113 may be substantially the same as a refractive index of the glass 120. Likewise, the meaning of being substantially the same includes a case in which a difference therebetween is less than about 2%. Therefore, in the embodiment, the differences between refractive indexes of the glass 120, the first layer 111, the second layer 112, and the third layer 113 may be less than about 2%. In the embodiment, the refractive indexes of the glass 120, the first layer 111, the second layer 112, and the third layer 113 may be about 1.48 to about 1.52, and for example, may be about 1.5.

As described above, since the refractive indexes of the glass 120 and the first layer 111, the second layer 112, and the third layer 113 of the groove 110 are the same, the groove 110 is not visible.

In the present embodiment, a storage modulus of the first layer 111 may be higher than that of the second layer 112 and the third layer 113. The storage modulus of the first layer 111 may be about 0.046 megapascal (MPa) or less at 20 degrees Celsius (° C.), and may be about 0.19 MPa or less at −20° C.

Since the storage modulus of the first layer 111 is the highest, the first layer 111 has a higher compression characteristic than other layers. The first layer 111 is a layer closest to the inner surface IA of the cover window 100, and is the layer to which the highest compressive stress is applied when the cover window 100 is folded. However, as in the present embodiment, when the first layer 111 includes a compression-resistant material, and when the cover window 100 is folded, the first layer 111 may be easily folded while being compressed.

A viscosity of a resin included in the first layer 111 may be lower than that of a resin included in another layer. In an embodiment, for example, the first layer 111 may include a low viscosity material having a viscosity of about 4 centipoise (cps) to about 40 cps. In the present embodiment, the first layer 111 may include an acrylate-based resin.

In the present embodiment, elongation (%) of the third layer 113 may be higher than that of the first layer 111 and the second layer 112. Specifically, the elongation of the third layer 113 may be about 120% or more. The third layer 113 is a layer to which the highest tensile stress is applied when the cover window 100 is folded. In one or more embodiment of the cover window 100, since the third layer 113 has a high elongation characteristic, when the cover window 100 is folded, the third layer 113 may be easily folded while being elongated.

A viscosity of a resin included in the third layer 113 may be higher than that of resins included in other layers. In an embodiment, for example, the third layer 113 may include a high viscosity material having a viscosity of about 2000 cps to about 9000 cps. In the present embodiment, the third layer 113 may include a silicone-based resin.

In the present embodiment, the second layer 112 may have a neutral characteristic. The first layer 111 has a high compression characteristic, and the third layer 113 has a high elongation characteristic. The second layer 112 is disposed between the first layer 111 and the third layer 113 along a depth of the groove 110, and may connect the first layer 111 and the third layer 113 to each other while having a compression characteristic and an elongating characteristic evenly.

The viscosity of the resin included in the second layer 112 may be between the viscosity of the first layer 111 and the viscosity of the resin included in the third layer 113. In an embodiment, for example, the second layer 112 may include a material having a viscosity of about 100 cps to about 600 cps. In the present embodiment, the second layer 112 may include a urethane acrylate-based resin.

In the present embodiment, creep at 25° C. of the first, second, and third layers 111, 112, and 113 may be about 15% or less. The creep means a degree of elongation after 600 seconds have elapsed under a constant load. In addition, recovery of the first, second, and third layers 111, 112, and 113 may be about 95% or more at 25° C. The recovery means a degree of restoration compared to the original when the applied load in the creep is removed. Since the first layer 111 to the third layer 113 satisfy the creep and recovery characteristics as described above, even if the cover window 100 is repeatedly folded, it may have durability.

In addition, in the present embodiment, transmittance of the first, second, and third layers 111, 112, and 113 at 550 nanometers (nm) may be about 90% or more. Therefore, the transmittance of the cover window 100 including the groove 110 may be maintained. In addition, glass transition temperatures of the first, second, and third layers 111, 112, and 113 may be about −20° C. or less. Therefore, a shape thereof may be stably maintained in a use environment thereof.

A thickness of the glass may be defined in a direction from the outer surface OA and the inner surface IA (e.g., a thickness direction). In the embodiment, a first thickness t1 (e.g., total thickness) of the cover window 100 may be about 150 micrometers (μm) or more. The first thickness t1 may be maximum thickness of the glass 120 or a distance between the outer surface OA and the inner surface IA, without being limited thereto. When the first thickness t1 of the cover window 100 is less than about 150 μm, it may be vulnerable to external impact. In addition, a second thickness t2 of the glass 120 in an area corresponding to the groove 110 is disposed may be about 30 μm or less. When the second thickness t2 of the glass 120 in the area in which the groove 110 is disposed is more than about 30 μm, an effect of improving folding due to formation of the groove 110 may not be sufficient. The second thickness t2 may be minimum thickness of the glass 120 or a distance between a bottom of the groove 110 and the inner surface IA, without being limited thereto. In an embodiment, the glass 120 may include a thickness at the folding portion B and at the non-folding portion A, the thickness of the glass 120 at the non-folding portion may be about 150 μm or more, and the thickness of the glass 120 corresponding to the groove 110 may be about 30 μm or less.

In the present embodiment, thickness ratios of the first layer 111, the second layer 112, and the third layer 113 variously relative to each other may be the same as or different from each other. In an embodiment, for example, when the first layer 111, the second layer 112, and the third layer 113 have the same/similar thicknesses, the thickness ratio of the first layer 111, the second layer 112, and the third layer 113 variously relative to each other may be about 0.9-1.1:0.9-1.1:0.9-1.1.

Alternatively, the thicknesses of the first layer 111, the second layer 112, and the third layer 113 may be different from each other. That is, when the first layer 111, the second layer 112, and the third layer 113 have different thicknesses, the thickness ratio of the first layer 111, the second layer 112, and the third layer 113 variously relative to each other may be about 1-3:1-3:1-3. Two layers among the first layer 111, the second layer 112, and the third layer 113 may have the same thickness, the other layer may have a different thickness, or all of the three layers may have different thicknesses. In an embodiment, a thickness difference between resin layers of the multi-layered resin layer may be about 10% to about 300%.

A side surface of the groove 110 may be defined by a side surface of the glass 120. In FIG. 4, a side surface of the groove 110 is illustrated as an inclined surface, but in some embodiments, the side surface of the groove 110 may be substantially perpendicular to the plane of the cover window 100.

Figure 5:
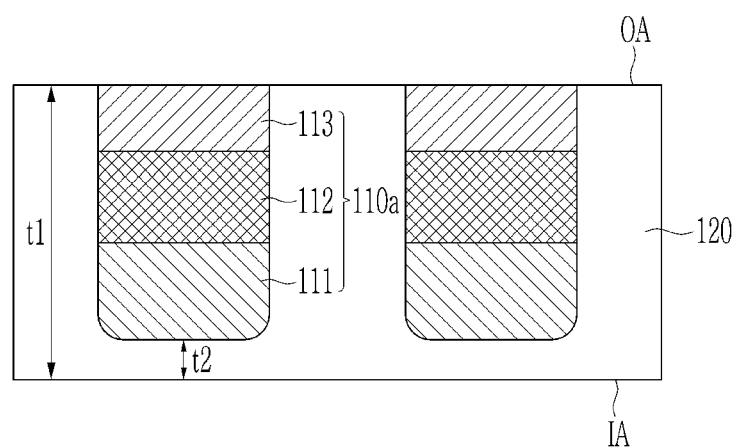
FIG. 5 illustrates a cross-sectional view of an embodiment of a folding portion of a cover window.

FIG. 5 illustrates a similar cross-sectional view as FIG. 4 for the cover window 100. Referring to FIG. 5, the cover window 100 is the same as the embodiment of FIG. 4 except that the side surface of the groove 110 is substantially perpendicular to the plane of the cover window 100. Detailed description of the same constituent elements will be omitted.

Referring to FIG. 5, the groove 110 of the cover window 100 is vertically formed. That is, the side surface of the groove 110 may have an angle of about 89 degrees or more with respect to the plane (e.g., a plane of the cover window 100, a plane of the outer surface OA, a plane of the inner surface IA, etc.).

FIG. 4 and FIG. 5 illustrate the configuration in which the groove 110 is filled with the first layer 111, the second layer 112, and the third layer 113, but in some embodiments, the groove 110 may be filled with two or four layers.

Figure 6:
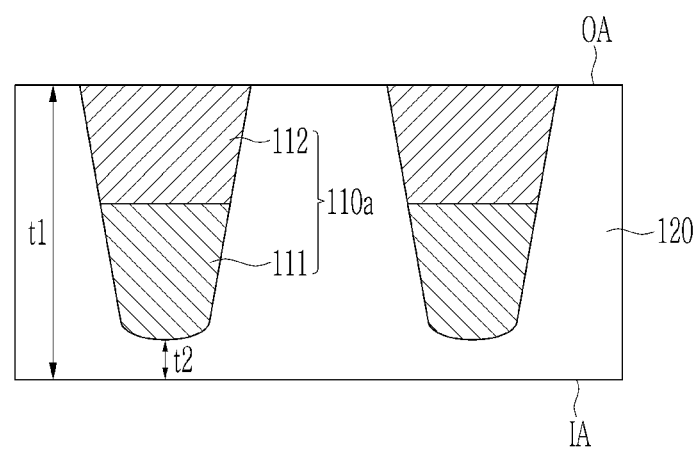
FIG. 6 illustrates a cross-sectional view of an embodiment of a folding portion of a cover window.

FIG. 6 illustrates a similar structure to the embodiment of FIG. 4 except that the groove 110 includes only the first layer 111 and the second layer 112.

In the embodiment of FIG. 6, a storage modulus of the first layer 111 may be higher than that of the second layer 112. The storage modulus of the first layer 111 may be about 0.046 MPa or less at 20° C., and may be about 0.19 MPa or less at −20° C.

Since the storage modulus of the first layer 111 is the highest, the first layer 111 has a higher compression characteristic than other layers. The first layer 111 is a layer closest to the inner surface IA of the cover window 100, and is the layer to which the highest compressive stress is applied when the cover window 100 is folded. As in the present embodiment, when the first layer 111 includes a compression-resistant material, and when the cover window 100 is folded, the first layer 111 may be easily folded while being compressed.

A viscosity of a resin included in the first layer 111 may be lower than that of a resin included in the second layer 112. In an embodiment, for example, the first layer 111 may include a low viscosity material having a viscosity of about 4 cps to about 40 cps. In the present embodiment, the first layer 111 may include an acrylate-based resin.

In the embodiment of FIG. 6, elongation (%) of the second layer 112 may be higher than that of the first layer 111. Specifically, the elongation of the second layer 112 may be about 120% or more. The second layer 112 is a layer to which the highest tensile stress is applied when the cover window 100 is folded. In one or more embodiment of the cover window 100, since the second layer 112 has a high elongation characteristic, when the cover window 100 is folded, the second layer 112 may be easily folded while being elongated.

A viscosity of a resin included in the second layer 112 may be higher than that of a resin included in the first layer 111. In an embodiment, for example, the second layer 112 may include a high viscosity material having a viscosity of about 2000 cps to about 9000 cps. In the present embodiment, the second layer 112 may include a silicone-based resin.

In this case, the refractive indexes of the first layer 111, the second layer 112, and the glass 120 may be substantially the same. In the present embodiment, the differences between the refractive indexes of the glass 120, the first layer 111, and the second layer 112 may be less than about 2%. In an embodiment, for example, the refractive indexes of the glass 120, the first layer 111, and the second layer 112 may be about 1.48 to about 1.52, and for example, may be about 1.5.

In the present embodiment, the creep at 25° C. of the first and second layers 111 and 112 may be about 15% or less. The recovery of the first layer 111 and the second layer 112 may be about 95% or more at 25° C. Since the first layer 111 and the second layer 112 satisfy the creep and recovery characteristics as described above, even if the cover window 100 is repeatedly folded, it may have durability.

In addition, in the present embodiment, the transmittance of the first and second layers 111 and 112 at 550 nm may be about 90% or more. Therefore, even if the cover window 100 includes the groove 110, the transmittance may not be reduced. In addition, the glass transition temperatures of the first and second layers 111 and 112 may be about −20° C. or less. Therefore, a shape thereof may be stably maintained in a use environment thereof.

In the present embodiment, the first thickness t1 of the cover window 100 may be about 150 μm or more. When the thickness of the cover window 100 is less than about 150 μm, it may be vulnerable to external impact. In addition, the second thickness t2 of the glass 120 in an area in which the groove 110 is disposed may be about 30 μm or less. When the thickness of the glass 120 in the area in which the groove 110 is disposed is more than about 30 μm, an effect of improving folding due to formation of the groove 110 may not be sufficient.

In the present embodiment, the thickness ratios of the first layer 111 and the second layer 112 may be the same or different from each other. In an embodiment, for example, when the first layer 111 and the second layer 112 have the same/similar thicknesses, the thickness ratio of the first layer 111 and the second layer 112 may be about 0.9-1.1:0.9-1.1.

Alternatively, the thicknesses of the first layer 111 and the second layer 112 may be different from each other. That is, when the first layer 111 and the second layer 112 have different thickness ratios, the thickness ratio of the first layer 111 and the second layer 112 may be about 1-3:1-3.

Figure 7:
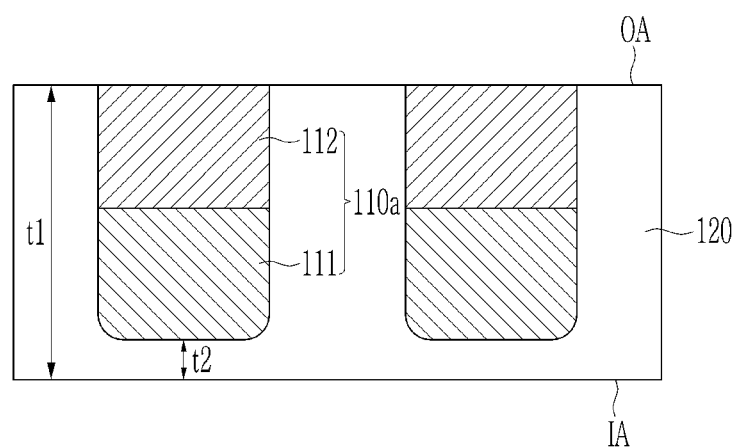
FIG. 7 illustrates a cross-sectional view of an embodiment of a folding portion of a cover window.

FIG. 7 illustrates a similar structure as the embodiment of FIG. 6 except that the side surface of the groove 110 is substantially perpendicular to the plane of the cover window 100. Detailed description of the same constituent elements will be omitted.

Referring to FIG. 7, the groove 110 of the cover window 100 according to the present embodiment is substantially vertically formed. That is, the side surface of the groove 110 may have an angle of about 89 degrees or more with respect to the plane.

Figure 8:
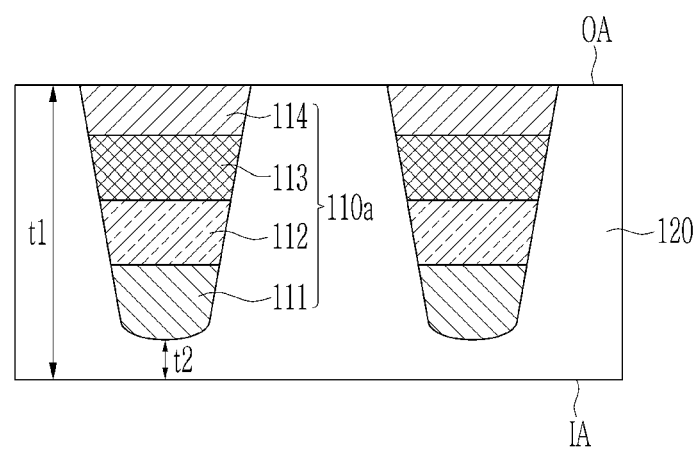
FIG. 8 illustrates a cross-sectional view of an embodiment of a folding portion of a cover window.

FIG. 8 illustrates a similar structure as the embodiment of FIG. 4 except that the groove 110 includes the first layer 111, the second layer 112, the third layer 113, and a fourth layer 114.

The first layer 111, the second layer 112, the third layer 113, and the fourth layer 114 may include the same material or different materials. In an embodiment for example, the first layer 111, the second layer 112, the third layer 113, and the fourth layer 114 may each include one or more of an acrylate-based resin, a urethane acrylate-based resin, and a silicone-based resin.

In the embodiment of FIG. 8, a storage modulus of the first layer 111 may be higher than that of the second layer 112 to the fourth layer 114. The storage modulus of the first layer 111 may be about 0.046 MPa or less at 20° C., and may be about 0.19 MPa or less at −20° C.

Since the storage modulus of the first layer 111 is the highest, the first layer 111 has a higher compression characteristic than other layers. The first layer 111 is a layer closest to the inner surface IA of the cover window 100, and is the layer to which the highest compressive stress is applied when the cover window 100 is folded. As in the present embodiment, when the first layer 111 includes a compression-resistant material, and when the cover window 100 is folded, the first layer 111 may be easily folded while being compressed.

A viscosity of a resin included in the first layer 111 may be lower than that of resins included in other layers. In an embodiment, for example, the first layer 111 may include a low viscosity material having a viscosity of about 4 cps to about 40 cps. In the present embodiment, the first layer 111 may include an acrylate-based resin.

In the embodiment of FIG. 8, elongation (%) of the fourth layer 114 may be higher than that of the first layer 111 to the third layer 113. Specifically, the elongation of the fourth layer 114 may be about 120% or more. The fourth layer 114 is a layer to which the highest tensile stress is applied when the cover window 100 is folded. In the cover window 100 according to the present embodiment, since the fourth layer 114 has a high elongation characteristic, when the cover window 100 is folded, the fourth layer 114 may be easily folded while being elongated.

A viscosity of a resin included in the fourth layer 114 may be higher than that of resins included in other layers. In an embodiment, for example, the fourth layer 114 may include a high viscosity material having a viscosity of about 2000 cps to 9000 cps. In the present embodiment, the fourth layer 114 may include a silicone-based resin.

In this case, the refractive indexes of the first layer 111, the second layer 112, the third layer 113, the fourth layer 114, and the glass 120 may be substantially the same. In the present embodiment, the meaning that the refractive indexes are substantially the same includes a case in which a difference therebetween is less than about 2%. Accordingly, in the present embodiment, the differences between the refractive indexes of the glass 120 and the first layer 111 to the fourth layer 114 may be less than about 2%. In the embodiment, the refractive indexes of the glass 120, the first layer 111, the second layer 112, the third layer 113, and the fourth layer 114 may be about 1.48 to about 1.52, and for example, may be about 1.5.

In the present embodiment, the creep at about 25° C. of the first to fourth layers 111 to 114 may be about 15% or less. In addition, the recovery of the first layer 111 to the fourth layer 114 may be about 95% or more at 25° C. Since the first layer 111 to the fourth layer 114 satisfy the creep and recovery characteristics as described above, even if the cover window 100 is repeatedly folded, it may not be damaged.

In addition, in the present embodiment, the transmittance of the first to fourth layers 111 to 114 at 550 nm may be about 90% or more. Therefore, even if the cover window 100 includes the groove 110, the transmittance may not be reduced. In addition, the glass transition temperatures of the first to fourth layers 111 to 114 may be about −20° C. or less. Therefore, a shape thereof may be stably maintained in a use environment thereof.

In the present embodiment, the first thickness t1 of the cover window 100 may be about 150 μm or more. When the thickness of the cover window 100 is less than about 150 μm, it may be vulnerable to external impact. In addition, the second thickness t2 of the glass 120 in an area in which the groove 110 is disposed may be about 30 μm or less. When the thickness of the glass 120 in the area in which the groove 110 is disposed is more than about 30 μm, an effect of improving folding due to formation of the groove 110 may not be sufficient.

In the present embodiment, the thickness ratios of the first to fourth layers 111 to 114 may be the same or different from each other. In an embodiment, for example, when the first to fourth layers 111 to 114 have the same/similar thicknesses to each other, the thickness ratio of the first layer 111, the second layer 112, the third layer 113, and the fourth layer 114 may be about 0.9-1.1:0.9-1.1:0.9-1.1:0.9-1.1.

Alternatively, the thicknesses of the first layer 111 to the fourth layer 114 may be different from each other. That is, when the first layer 111 to the fourth layer 114 have different thickness ratios, the thickness ratio of the first layer 111, the second layer 112, the third layer 113, and the fourth layer 114 may be about 1-3:1-3:1-3:1-3.

Figure 9:
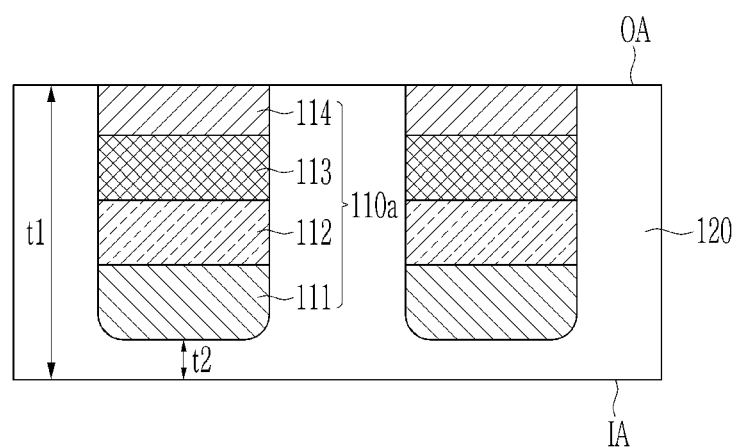
FIG. 9 illustrates a cross-sectional view of an embodiment of a folding portion of a cover window.

FIG. 9 illustrates a similar structure as the embodiment of FIG. 8 except that the side surface of the groove 110 is substantially perpendicular to the plane of the cover window 100. Detailed description of the same constituent elements will be omitted.

Referring to FIG. 9, the groove 110 of the cover window 100 according to the present embodiment is substantially vertically formed. That is, the side surface of the groove 110 may have an angle of about 89 degrees or more with respect to the plane.

Hereinafter, an embodiment of a method of manufacturing or providing the cover window 100 will be described. FIG. 10 to FIG. 13 illustrate a manufacturing method of a cover window 100.

FIG. 10 to FIG. 13 illustrate an embodiment of a process for providing the cover window 100 in the embodiment of FIG. 9. However, this is for convenience of explanation, and the following method may be applied even in an embodiment in which the groove 110 is filled with two or three layers instead of four layers.

Figure 10:
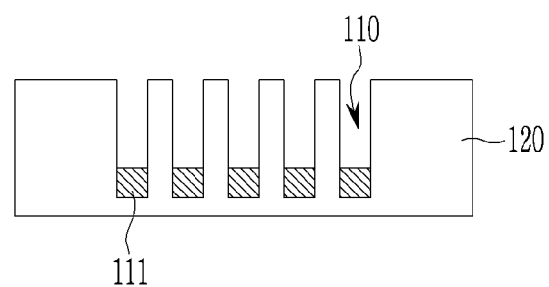
FIG. 10 to FIG. 13 illustrate an embodiment of a method of providing a cover window.
Figure 11:
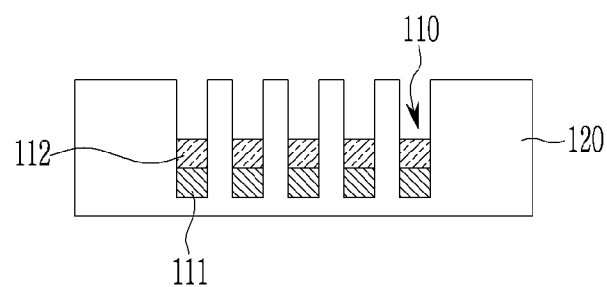
Figure 12:
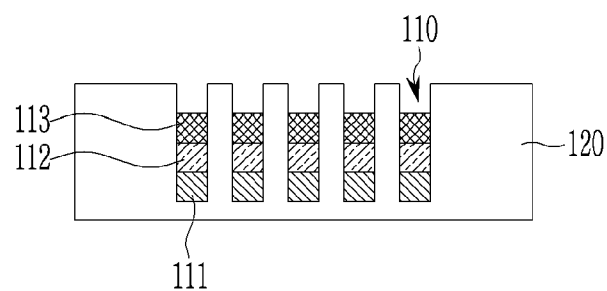
Figure 13:
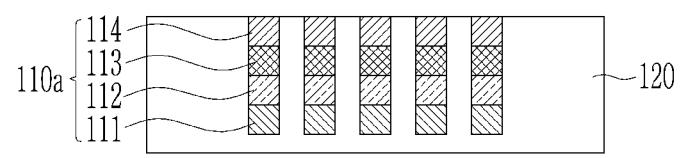

Referring to FIG. 10, the plurality of grooves 110 are formed in the glass 120, and then the first layer 111 is formed in the grooves 110 as a layer closest to the inner surface IA of the glass 120. As described above, the first layer 111 may be a resin having a high compression characteristic. The storage modulus of the first layer 111 may be about 0.046 MPa or less at 20° C., and may be about 0.19 MPa or less at −20° C.

The first layer 111 may include a low viscosity material having a viscosity of about 4 cps to about 40 cps. In an embodiment, for example, the first layer 111 may include an acryl-based resin.

Figure 14:
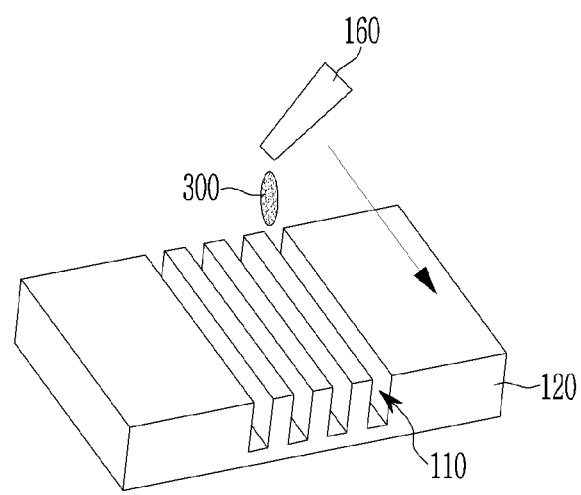
FIG. 14 schematically illustrates an embodiment of a process using an inkjet dispenser.

When the first layer 111 includes a low viscosity material, the first layer 111 may be filled by using an inkjet dispenser 160. FIG. 14 schematically illustrates an embodiment of a process using an inkjet dispenser 160. Referring to FIG. 14, a resin 300 as a layer-forming material may be applied to the groove 110 recessed into the glass 120 through an inkjet dispenser 160.

Referring back to FIG. 11, the second layer 112 is formed on the first layer 111. The second layer 112 may include an acryl-based resin or a urethane acrylate-based resin. The second layer 112 may include a resin having a higher viscosity than that of the first layer 111, or may include a resin having the same viscosity as that of the first layer 111. When the second layer 112 includes a resin having a viscosity of about 4 cps to about 40 cps, the second layer 112 may be formed by using the inkjet dispenser 160 as shown in FIG. 14. Alternatively, when the second layer 112 includes a resin having a viscosity of about 100 cps to about 1000 cps, it may be formed by a slot coating method.

Figure 15:
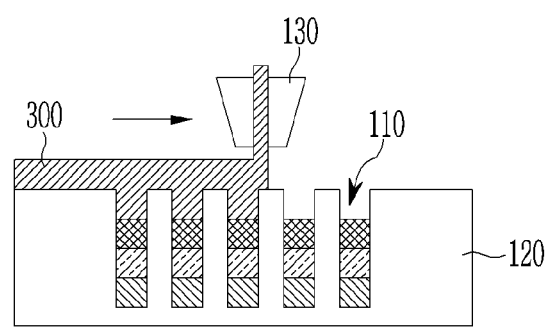
FIG. 15 schematically illustrates an embodiment of slot coating.

FIG. 15 schematically illustrates an embodiment of a slot coating method. Referring to FIG. 15, a slot die 130 moves above the grooves 110 formed in the glass 120 to discharge the resin 300, so that the resin 300 may be filled in the groove 110.

Referring back to FIG. 12, the third layer 113 is formed on the second layer 112. The third layer 113 may include an acryl-based resin, a urethane acrylate-based resin, or a silicone-based resin.

When the third layer 113 includes a resin having a viscosity of about 4 cps to about 40 cps, it may be formed by using the inkjet dispenser 160 as shown in FIG. 14. Alternatively, when the third layer 113 includes a resin having a viscosity of about 100 cps to about 1000 cps, it may be formed by the slot coating method as shown in FIG. 15.

Referring back to FIG. 13, the fourth layer 114 is formed on the third layer 113. The fourth layer 114 may include a urethane acrylate-based resin or a silicone-based resin. The fourth layer 114 may include a resin having a higher viscosity than that of the first layer 111. The elongation (%) of the fourth layer 114 may be higher than that of the first layer 111. Specifically, the elongation of the fourth layer 114 may be about 120% or more.

Figure 16:
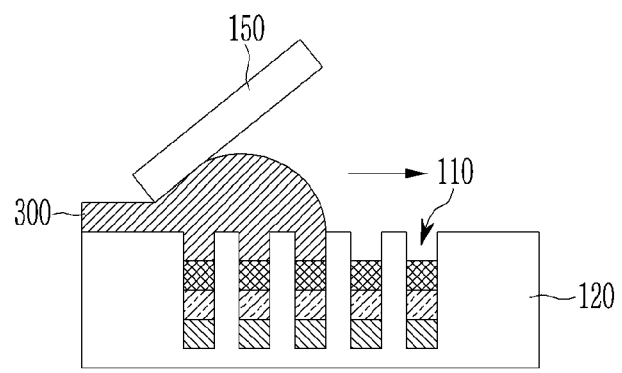
FIG. 16 schematically illustrates an embodiment of a vacuum compression process.

When the fourth layer 114 includes a resin having a viscosity of about 100 cps to about 1000 cps, it may be formed by the slot coating method as shown in FIG. 15. Alternatively, when the fourth layer 114 includes a high viscosity resin having a viscosity of about 5000 cps to about 20,000 cps, it may be formed by a vacuum compression process. FIG. 16 schematically illustrates an embodiment of a vacuum compression process. As shown in FIG. 16, a squeegee 150 moves above the resin 300 which is applied to the glass 120 to compress the resin 300 in a vacuum state, so that the groove 110 may be filled with the resin 300.

FIG. 10 to FIG. 13 illustrate the embodiment in which the groove 110 is filled with four layers, but a same process may be applied when the groove 110 is filled with two or three layers to provide the multi-layered material 110a. In this case, depending on the viscosity of the resin 300 which forms a respective layer of the multi-layered material 110a, respective layers may be provided by appropriately selecting one of the filling methods of FIG. 14 to FIG. 16. That is, the providing of the various layers within the groove 110 includes a process method corresponding to the viscosity of the various layers, respectively. In an embodiment for example, the process method for the first layer 111 may include an inkjet method, the process method for the second layer 112 may include an inkjet method or a slot coating method, and the process method for the third layer 113 may include a slot coating method or a vacuum compression method.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A cover window comprising:
    a glass facing a display panel, the glass including a folding portion and a non-folding portion;
    a groove in the folding portion of the glass; and
    a multi-layered resin layer which fills the groove, the multi-layered resin layer including a plurality of resin layers each directly contacting the glass within the groove,
    wherein the glass which is folded at the folding portion includes:
        an inner surface which is compressed,
        an outer surface which is stretched, and
        among the plurality of resin layers each directly contacting the glass within the groove:
            each of the plurality of resin layers has a storage modulus and an elongation,
            the storage modulus of a resin layer which is closest to the inner surface is largest,
            the storage modulus of the resin layer which is closest to the inner surface is about 0.046 megapascal or less at 20 degrees Celsius, and
            the elongation of a resin layer which is closest to the outer surface is largest.

2. The cover window of claim 1, wherein the groove is recessed in a direction from the outer surface of the glass toward the inner surface of the glass.

3. The cover window of claim 2, wherein the elongation of the resin layer which is closest to the outer surface is about 120% or more.

4. The cover window of claim 1, wherein among the plurality of resin layers each directly contacting the glass within the groove:
    each of the plurality of resin layers further has a refractive index, and
    a difference in refractive index between the plurality of resin layers is less than about 2%,
    the glass has a refractive index, and
    a difference in refractive index between the multi-layered resin layer and the glass is less than about 2%.

5. The cover window of claim 1, wherein the multi-layered resin layer and the glass each has a refractive index of about 1.48 to about 1.52.

6. The cover window of claim 1, wherein
    the plurality of resin layers each directly contacting the glass within the groove includes a first layer and a second layer in order in a direction from the inner surface to the outer surface,
    the first layer includes a resin including acrylate, and
    the second layer includes a resin including silicone.

7. The cover window of claim 1, wherein
    the plurality of resin layers each directly contacting the glass within the groove includes a first layer, a second layer, and a third layer in order in a direction from the inner surface to the outer surface,
    the first layer includes a resin including acrylate,
    the second layer includes a resin including acrylate or a resin including urethane, and
    the third layer includes a resin including silicone.

8. The cover window of claim 1, wherein
    the plurality of resin layers each directly contacting the glass within the groove includes a first layer, a second layer, a third layer, and a fourth layer in order in a direction from the inner surface to the outer surface,
    the first layer includes a resin including acrylate,
    the second layer and the third layer include a resin including acrylate or a resin including urethane, and
    the fourth layer includes a resin including silicone.

9. The cover window of claim 1, wherein among the plurality of resin layers each directly contacting the glass within the groove:
    each of the plurality of resin layers further has a thickness, and
    a thickness difference between the plurality of resin layers is about 10% to about 300%.

10. The cover window of claim 1, wherein among the plurality of resin layers each directly contacting the glass within the groove:
   each of the plurality of resin layers is formed from a material directly provided into the groove of the glass, the material having a viscosity,
   the viscosity of the material which forms the resin layer which is closest to the inner surface is lowest, and
   the viscosity of the material which forms the resin layer which is closest to the outer surface is highest.

11. The cover window of claim 1, wherein
   the glass further includes a side surface which defines the groove, and
   the side surface of the glass is inclined.

12. The cover window of claim 1, wherein
   the glass further includes a side surface which defines the groove, and
   the side surface of the glass is perpendicular to the inner surface.

13. The cover window of claim 1, wherein the glass further includes:
   a thickness at the folding portion and at the non-folding portion,
   the thickness of the glass at the non-folding portion is about 150 micrometers or more, and
   the thickness of the glass corresponding to the groove is about 30 micrometers or less.

14. The cover window of claim 1, wherein
   the cover window is foldable at the folding portion in a first direction, and
   the groove extends along a second direction which crosses the first direction.

15. A display device comprising:
a display panel; and
a cover window facing the display panel, the cover comprising:
   a glass including a folding portion and a non-folding portion;
   a groove in the folding portion of the glass; and
   a multi-layered resin layer which fills the groove, the multi-layered resin layer including a plurality of resin layers each directly contacting the glass within the groove,
wherein the glass which is folded at the folding portion includes:
   an inner surface which is compressed,
   an outer surface which is stretched, and
   among the plurality of resin layers each directly contacting the glass within the groove:
      each of the plurality of resin layers has a storage modulus and an elongation,
      the storage modulus of a resin layer which is closest to the inner surface is largest,
      the storage modulus of the resin layer which is closest to the inner surface is about 0.046 megapascal or less at 20 degrees Celsius, and
      the elongation of a resin layer which is closest to the outer surface is largest.

* * * * *